Feb. 14, 1928.

L. R. ZIFFERER

TOGGLE BOLT

Filed March 19, 1926

1,658,959

Inventor:
Lothar R. Zifferer,
By
Attys.

Patented Feb. 14, 1928.

1,658,959

UNITED STATES PATENT OFFICE.

LOTHAR R. ZIFFERER, OF COLUMBIA, PENNSYLVANIA.

TOGGLE BOLT.

Application filed March 19, 1926. Serial No. 95,864.

This invention relates to a toggle bolt with which is associated spring means which tends normally to position the head transversely of the bolt. More particularly this invention is concerned with the spring itself, its co-operative relation to the head and bolt, and the manner of its assembly therewith.

In a toggle device of the kind contemplated, the bolt may be provided with a suitable means, such as a fixed pin, or adjustable nut, whereon is pivotally mounted the head. Such a nut would be loosely positioned upon the bolt so that the latter may be screwed home by rotation relative to the nut. The head, which is aligned with the bolt during insertion of the device into anchoring position, should be free to turn upon its mounting into transverse relation with the bolt whereby to engage with the inside face of a wall or ceiling to which the fastening is secured. Difficulty is commonly experienced, however, in inducing the head to change from a position in parallelism with the bolt to one which is transverse thereto. While it has been known to utilize spring means for restoring the head to a transverse position after it has passed through a hole to the inner side of a wall or ceiling, such a toggle bolt is usually complicated, its parts, particularly the spring, are difficult to assemble in operative relation, and, in some cases, the spring causes the head, when in transverse position, to press against the bolt, whereby the one tends to rotate with the other, thus opposing tightening of the device in place.

According to the present invention, the head which is constructed in one piece is mounted to swing upon either side of the bolt in opposition to pressure of the spring means. Normally it lies in a central or transverse position where the spring force is exerted with a minimum balanced pressure at points equidistant from its pivotal mounting. In this normal or working position, the head is freely movable upon the bolt, due to substantially complete cessation of spring pressure thereupon, thus rendering it easy and simple to screw the bolt home without any tendency for a corresponding rotation of the head. I accomplish the results above noted by means which are simple, inexpensive, and readily assembled in place.

My invention may advantageously be embodied in a construction such as is set forth in the accompanying drawing in the manner following:

Figure 3:
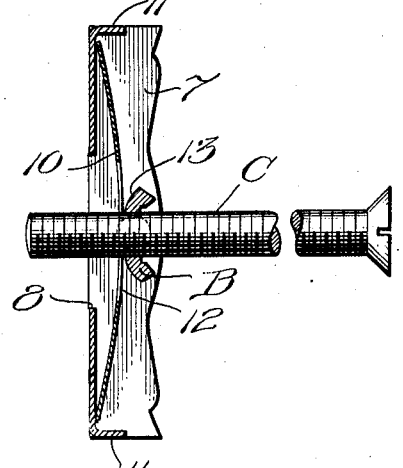
Fig. 3 is a view in section therethrough, taken on line 3—3 of Fig. 2.
Figure 4:
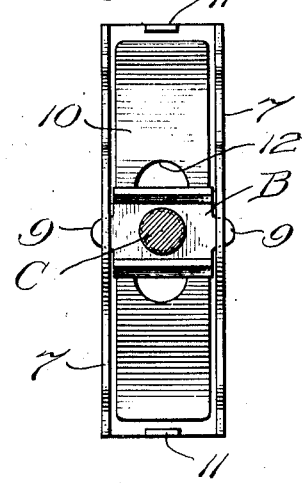
Fig. 4 is a view in elevation looking toward the inner side of the head.
Figure 5:
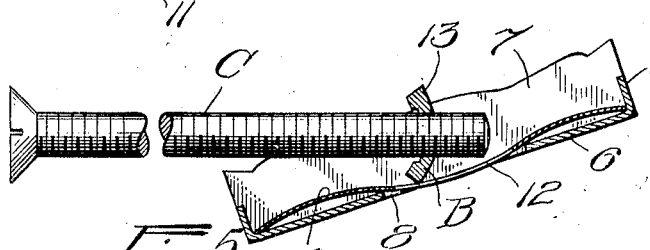

Fig. 5, which is a view similar to Fig. 3, shows the head as swung close to a position of alignment with the bolt.

The toggle head A is preferably stamped from sheet metal to provide a back 6 which is reinforced by a pair of side walls 7 extending from its opposite edges in parallel relation. The resulting structure is substantially channel or U-shaped in cross section. The back 6 is cut away centrally to provide a slot 8, as shown.

A pivotal mounting for the head may be provided in a pair of trunnions 9 which extend oppositely from a nut B which is in threaded engagement with a bolt C. The two trunnions pass through suitable holes in the side walls of the head, about equidistantly of its length. In such a construction the head may swing around upon opposite sides of the bolt, provided that the nut is so adjusted upon the latter that its end does not protrude through the slot 8. When moved to an advanced position, the bolt extends through this slot as far as necessary to secure the work in place.

Figure 1:
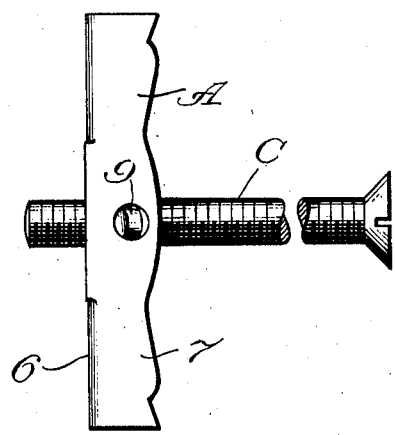
Figure 1 is a side elevation of the toggle bolt.
Figure 2:
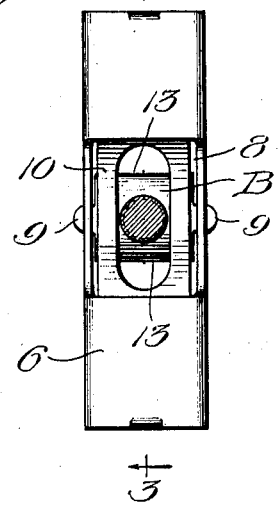
Fig. 2 is an end elevation thereof.

Mounted within the head is a leaf spring 10 extending between its side walls 7 and two wings 11 which depend from the ends of the back 6. This spring is bowed or raised away from the back of the head, and is provided centrally with an elongated slot 12 through which the bolt may pass. The central portion of the spring which is weakest because of the slot 12 is adapted to bear against the flat end of the nut B whereby the spring is retained in permanently assembled relation within the head. The two opposite edges of the nut which face toward the ends of the head are curved or beveled away from the spring, as at 13, for a purpose which will presently appear, and to obviate their protrusion beyond the work engaging edges of the head, the trunnions 9 may be inclined slightly away from its back 6, as shown in Fig. 1. By this expedient, the nut is positioned close to the back, yet is afforded turning clearance sufficient for all requirements.

In the normal or working position of the head, the spring which is confined between the head and nut exerts little, if any, pressure upon these parts. When the head is swung upon the trunnions 9 as a pivot, one or the other of the two nut edges 13 approaches the head back 6 in consequence of which the spring is bent back or straightened out, thereby increasing its tension. The clearance between the spring ends and the wings 11 may be so close as to prevent straightening of the spring, in consequence of which it is bent into a compound or reverse curve, as shown in Fig. 5, whereby its effective tension is enhanced. On account of the fact that the nut edges 13 are normally inclined away from the spring when the head is in transverse position, the points at which the spring exerts its pressure in any other position will lie always to one side of the pivotal center of the toggle head. In other words, the bearing point of the nut relative to the spring is shiftable to an off-center position—it moves from the spring center toward one end thereof as the toggle head is swung down upon the bolt. Because of the manner in which the spring is required to exert its force, due to this peculiarity of construction, the head tends to return to transverse position, as shown, for example, in Fig. 3. The toggle head, which normally is subjected to very little, if any, spring pressure is free to adjust itself within considerable limits against the wall surface with which it is engaged.

From the preceding description, it will be understood that my invention is characterized by spring means which tends to restore the head to a transverse position whenever, by swinging in either direction, it approaches parallelism with the bolt, the spring being free of the bolt so as to exert its opposing pressures only upon the head and mounting therefor. It is also characterized by confining between the head and its pivotal mounting a flat spring which is sufficiently bowed and tensioned to exert desired opposing pressures at its center and two ends. This spring, it should be noted, may be slipped in place by an endwise movement after the head is assembled upon its mounting, or it may be set in position at the time this assembly is made. Because of the configuration of the head, the spring remains confined in operative relation to its associated parts, and it is unnecessary that any part of the spring be bent around or fastened to any other part in order to complete the toggle bolt assembly. Not only do I utilize a minimum number of components in the present toggle bolt, but the construction and assembly of its few parts is simplified to a marked degree. For these reasons, as well as others, the device may be produced at small expense, and may be counted on to work dependably. Any construction answering to the preceding description, and more particularly to the terms of the appended claims, I would accordingly include within the scope of my invention.

I claim:

1. A toggle bolt having a mounting with oppositely inclined trunnions extended from two of its sides, the two other sides of the mounting having their edges similarly inclined, a head pivotally supported on the trunnions of the mounting, and a spring interposed between the head and mounting and adapted to bear against the inclined edges of the latter when the former is rocked from a normal position relative thereto, substantially as described.

2. A toggle bolt having a channel head, a nut having trunnions traversing opposite walls of the head to provide a pivotal mounting therefor, the trunnions being oppositely inclined away from the head whereby to reduce the space between itself and the nut when the head is in transverse relation to the axis of the nut, and a spring interposed between the head and nut and adapted to exert opposing pressures on the head and nut, substantially as described.

3. In a toggle bolt, the combination of a toggle head having depending sides and ends, a headed bolt, means carried by the bolt and extending between the depending sides of said toggle head for providing a pivotal mounting therefor, a leaf spring loosely positioned between said pivotal mounting and toggle head and confined in place by the sides and ends thereof, the spring being bowed away from the toggle head to exert opposing pressures against the toggle head and its pivotal mounting.

4. In a toggle bolt, the combination of a channeled toggle head having means depending at its two ends, a bowed spring loosely receivable within the toggle head channel for confinement between its end depending means, a pivotal mounting for the toggle head extending transversely thereof, a headed bolt on which said pivotal mounting is carried, there being on the pivotal mounting a bearing point which receives thrusts from the spring centrally of its length when the toggle head is in one position and off-centrally of its length when the toggle head is moved to other positions.

5. In a toggle bolt, the combination of a toggle head, a headed bolt, means carried by the bolt providing a pivotal mounting for the toggle head, and an interposed spring member having normally a simple curve adapted to change to a compound curve with increase in tension.

6. In a toggle bolt, the combination of a toggle head, a headed bolt, means carried by the bolt providing a pivotal mounting for the toggle head, and a leaf spring loosely interposed between said pivotal mounting and toggle head and bowed to exert opposing pressures on the toggle head and its pivotal mounting, there being means on the pivotal mounting for straightening the spring when the toggle head is swung to one position, and means on the toggle head for resisting such spring straightening, the spring being thereby bendable into a compound curve.

7. In a toggle bolt, the combination of a toggle head, a headed bolt, means carried by the bolt providing a pivotal mounting for the toggle head, and a leaf spring interposed between said pivotal mounting and toggle head and having a weakened central portion which exerts thrusts against said pivotal mounting, said central portion tending to yield with movement of the pivotal mounting towards the head.

LOTHAR R. ZIFFERER.